US008385401B2

(12) United States Patent
Miller

(10) Patent No.: US 8,385,401 B2
(45) Date of Patent: Feb. 26, 2013

(54) EQUALIZER AND METHOD FOR PERFORMING EQUALIZATION

(75) Inventor: Frederick W. Miller, Santa Clara, CA (US)

(73) Assignee: Avago Technologies Fiber IP (Singapore) Pte. Ltd, Singapore (SG)

( * ) Notice: Subject to any disclaimer, the term of this patent is extended or adjusted under 35 U.S.C. 154(b) by 1164 days.

(21) Appl. No.: 12/254,661

(22) Filed: Oct. 20, 2008

(65) Prior Publication Data

US 2010/0098147 A1     Apr. 22, 2010

(51) Int. Cl.
*H03H 7/30* (2006.01)
*H04Q 1/20* (2006.01)
*H03K 5/159* (2006.01)

(52) U.S. Cl. ..................... 375/233; 333/28 R

(58) Field of Classification Search .......... 375/229–230, 375/232–233, 285, 350; 708/300, 322–323; 333/18, 28 R; 330/303–304; 370/290–291; 327/552–553
See application file for complete search history.

(56) References Cited

U.S. PATENT DOCUMENTS

| 6,492,922 | B1 | 12/2002 | New |
| 7,075,363 | B1 | 7/2006 | Thon |
| 2004/0193669 | A1 | 9/2004 | Shirani |
| 2006/0127100 | A1* | 6/2006 | Frankel et al. ............... 398/158 |
| 2007/0091995 | A1* | 4/2007 | Ibragimov et al. ........... 375/233 |
| 2007/0121718 | A1* | 5/2007 | Wang et al. ................... 375/233 |
| 2007/0133671 | A1* | 6/2007 | Tsai ............................. 375/233 |
| 2009/0067485 | A1* | 3/2009 | Takano ........................ 375/232 |

* cited by examiner

*Primary Examiner* — Jean B Corrielus

(57) ABSTRACT

An FFE/DFE equalizer is provided that uses unclocked FIR filters. At least one of the unclocked FIR filters has tunable delay cells that can be tuned to adjust their respective time delay time periods. Because the FIR filters of the FFE/DFE equalizer are unclocked, the complexity and die area associated with clocking circuits are avoided, thereby enabling costs to be reduced. Because the delay cells of at least one of the FIR filters are tunable to enable their respective time delay periods to be adjusted, very good equalizer performance is achieved without having to use clocked circuits. In addition, because clocked circuits are not used in the FIR filters, the need for clocking circuits to control the timing of clocked circuits is obviated, which leads to a reduction in the amount of power consumed by the FFE/DFE equalizer.

29 Claims, 6 Drawing Sheets

EQUALIZER AND METHOD FOR PERFORMING EQUALIZATION

TECHNICAL FIELD OF THE INVENTION

The invention relates to equalizer systems used in optical communications systems. More particularly, the invention relates to a feed-forward equalizer/decision feedback equalizer (FFE/DFE equalizer).

BACKGROUND OF THE INVENTION

Equalizer systems are used in optical communications systems, such as in an optical receiver of an optical transceiver module, to remove inter-symbol interference (ISI) contained in a transmitted symbol sequence. A variety of equalizer systems are used for this purpose. Two equalizer systems that are commonly used to remove ISI are decision feedback equalizers (DFEs) and feed-forward equalizers (FFEs). A DFE is an equalizer that uses a bit decision about a previous bit (i.e., post-cursor information) to remove sources of channel degradation (e.g., ISI, dispersion, etc.) contributed by the previous bit from the current bit being decided. Thus, a DFE removes sources of channel degradation associated with past (i.e., previously decided) bits. An FFE is essentially a finite impulse response (FIR) filter that uses a bit decision about a current bit (i.e., pre-cursor information) to remove sources of channel degradation contributed by the current bit from the next bit to be decided.

FIG. 1 illustrates a block diagram of a typical known unclocked, or clockless, FIR filter 2 that operates on a continuous, real-time signal. The FIR filter 2 has N delay cells and N taps, where N is a positive integer that is greater than or equal to 1. Each delay cell 1-N delays the input data signal by a predetermined delay time period. At the end of the respective delay time periods, the respective delayed versions of the input signal are output from the respective delay cells. At respective taps of the FIR filter 2, respective multipliers 4 multiply the respective delayed versions of the input signal by respective tap weights. The products of the multiplication operations are then summed by a summer 7 to produce the filtered output data signal. The delay time period provided by each delay cell is normally set to either 0.5× unit interval (UI) or 1.0×UI, where UI corresponds to the length in time of a bit of the input data signal. In the unclocked FIR filter 2, the delay cells 1-N are analog linear delay cells, which are susceptible to time delay period variations caused by process drift, temperature drift, and/or drift caused by other environmental factors. For this reason, in use applications in which very precise time delay periods are required, the unclocked FIR filter is generally not a suitable solution.

FIG. 2 illustrates a block diagram of a typical known clocked FIR filter 9, which operates on an input data signal in the discrete time domain to produce a filtered output data signal. The FIR filter 9 has N delay cells and N taps, where N is a positive integer that is greater than or equal to 1. Each delay cell 1-N delays the incoming data sample by a predetermined delay time period. At the end of the delay time period, the respective sample values are multiplied by their respective tap weights by multipliers 14. The products of the multiplication operations are then summed by the summer 17 to produce the filtered output sample. As with the unclocked FIR filter 2 shown in FIG. 1, the delay time period for the clocked FIR filter 9 shown in FIG. 2 is normally set to either 0.5UI or to 1.0UI. In the clocked FIR filter 9, the delay cells 1-N are analog/digital delay cells, such as D flip flops, the timing of which is controlled by a clock signal, CLK, output from a clock and data recovery circuit (CDR) (not shown). The bit period, UI, is equal to the period of CLK. Depending on how they are logically configured, the D flip flops latch in the respective sample values on either the rising or the falling edge of CLK and output their respective stored sample values on the next rising or falling edge of CLK. Using clocked flip flops for this purpose enables the delay time periods to be very precisely controlled. Consequently, the clocked FIR filter 9 is a suitable solution in use applications in which the delay time periods need to be very precise and unvarying.

FIG. 3 illustrates a block diagram of a typical known FFE/DFE equalizer 21 that is made up of a linear buffer 22, an FFE 23, a DFE 24, a CDR 25, and a delay locked loop (DLL) 26. The delay time period variations that can result when using an unclocked FIR filter generally have minimal impact on the performance of an FFE equalizer that incorporates the unclocked FIR filter. However, delay time period variations can have a major detrimental impact on the performance of a DFE. For this reason, the DFE 24 incorporates a clocked FIR filter 27, which is an FIR filter of the type shown in FIG. 2. The FFE 23 may incorporate an unclocked FIR 28, such as the FIR filter shown in FIG. 1. The DFE 24 also incorporates a slicer 29 that performs quantization.

In the DFE 24, optimal performance is normally achieved when the time delay periods are equal to 1UI. The approach that is commonly used to achieve precisely 1UI time delay periods in the DFE 24 is as follows. The DLL 26 receives the recovered clock signal output from the CDR 25 and the quantized sample value output from the slicer 29. The DLL 26 properly aligns the recovered clock with the sample value output from the slicer 29. The DLL then provides the aligned clock signal to the clocked FIR filter 27 of the DFE 24. The outputs of the clocked FIR filter 27 and of the unclocked FIR filter 28 are combined by adder 31 to remove sources of channel degradation (e.g., ISI and dispersion) from the signal being input to the DFE 24.

The configuration of the FFE/DFE equalizer 21 shown in FIG. 3 enables very precise time delay periods to be achieved while introducing only a minimal phase delay in the clock signal provided to the first tap of the clocked FIR filter 27. These are key factors in ensuring proper performance of the FFE/DFE equalizer 21. However, due in large part to the need for the clocking circuitry (e.g., the DLL 25 and any clock distribution circuitry), the FFE/DFE equalizer 21 uses relatively complex circuitry, consumes a significant amount die area and dissipates a significant amount of power. In addition, the FFE/DFE equalizer 21 is relatively expensive to manufacture due to circuit complexity and die area.

A need exists for an FFE/DFE equalizer that has very precise timing and high accuracy, and that has relatively low circuit complexity, consumes a relatively small area on the die, and dissipates a relatively small amount of power.

SUMMARY OF THE INVENTION

The invention is directed to an equalizer and method of performing equalization. The equalizer comprises at least a first FIR filter comprising N tunable delay cells cascaded between an input of the first FIR filter and an output of the first FIR filter, and a delay control component. Each tunable delay cell provides a respective time delay period during which the signal input to the respective delay cell is delayed before being output from the respective delay cell. The time delay periods provided by the respective tunable delay cells of the FIR filter are adjustable such that the respective tunable time delay periods can be adjusted. The delay control component is configured to perform a calibration algorithm that determines an amount by which the respective tunable time delay periods are to be adjusted and adjusts the respective tunable time delay periods by the determined amount such that the respective tunable delay cells provide the adjusted respective time delay periods.

The method comprises providing at least a first FIR filter comprising N tunable delay cells cascaded between an input of the first FIR filter and an output of the first FIR filter, processing a first input signal received at the input of the first FIR filter to produce an FIR output signal at the output of the first FIR filter, and performing a calibration algorithm that determines an amount by which the time delay periods of the tunable delay cells are to be adjusted and that adjusts the respective tunable time delay periods by the determined amount such that the respective tunable delay cells provide the adjusted respective time delay periods.

These and other features and advantages of the invention will become apparent from the following description, drawings and claims.

DETAILED DESCRIPTION OF AN ILLUSTRATIVE EMBODIMENT

In accordance with the invention, an FFE/DFE equalizer is provided that uses unclocked FIR filters. At least one of the unclocked FIR filters has tunable delay cells that can be tuned to adjust their respective time delay time periods. Because the FIR filters of the FFE/DFE equalizer are unclocked, the complexity, die area and power consumption associated with the clocking circuits used with clocked FIR filters are avoided, thereby enabling costs to be reduced. However, because the delay cells of at least one of the unclocked FIR filters are tunable to enable their respective time delay periods to be adjusted, very good performance is achieved without having to use clocked circuits in the FIR filters. In addition, because clocked circuits are not used in the FIR filters, the need for clocking circuits to control the timing of clocked circuits is obviated, which leads to a reduction in the amount of power consumed by the FFE/DFE equalizer.

Figure 4:
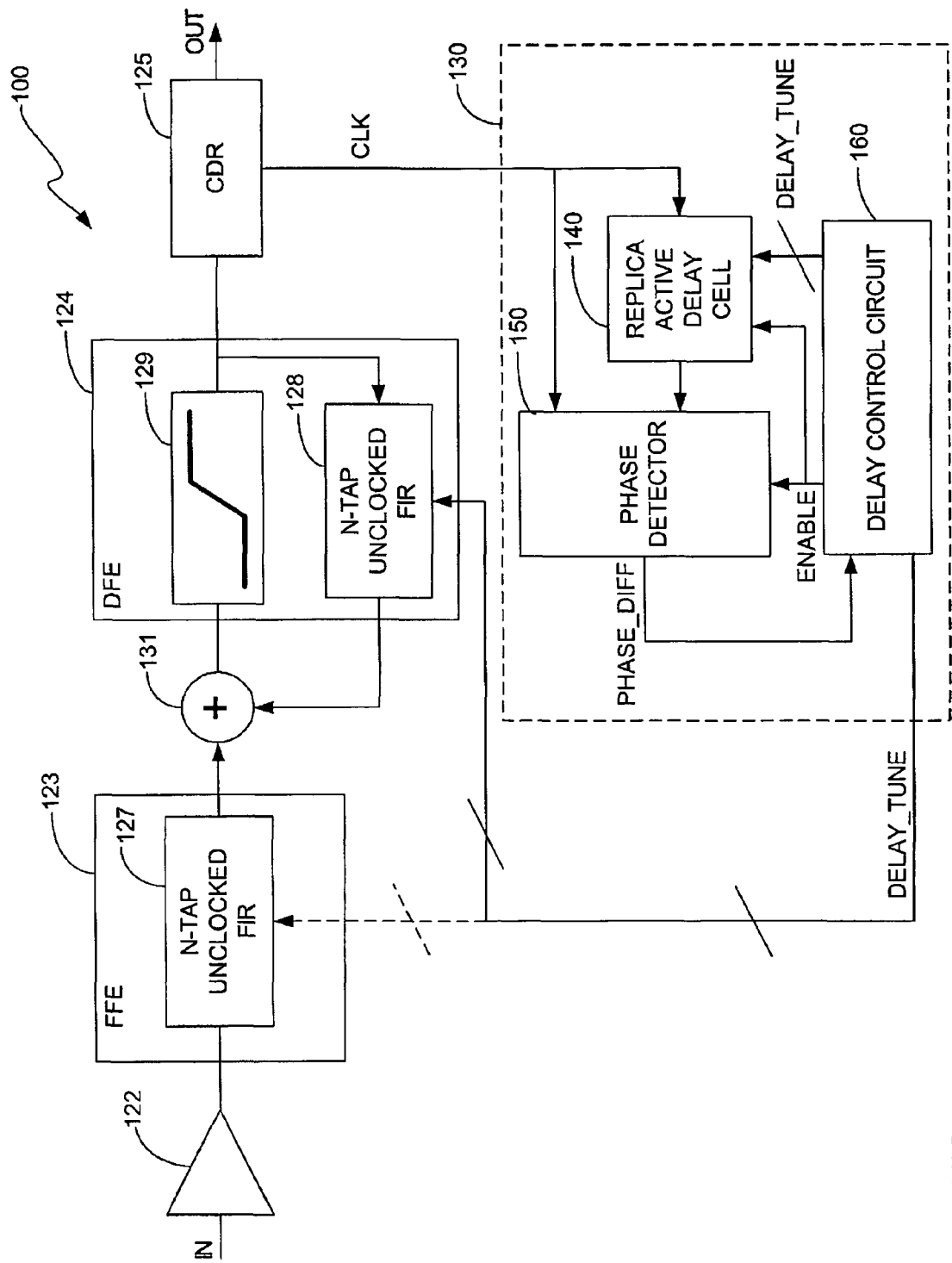
FIG. 4 illustrates a block diagram of an FFE/DFE equalizer in accordance with an illustrative embodiment of the invention.

FIG. 4 illustrates a block diagram of an FFE/DFE equalizer 100 in accordance with an illustrative embodiment of the invention. The equalizer 100 includes a buffer 122, an FFE 123, a DFE 124, a CDR 125, and a delay control component 130. The delay control component 130 includes a replica delay cell 140, a phase detector 150, and a delay control circuit 160. The FFE 123 and the DFE 124 comprise unclocked FIRs 127 and 128, respectively. The DFE 124 also includes a slicer 129. An adder 131 sums the outputs of the unclocked FIR filters 127 and 128 to remove sources of channel degradation (e.g., ISI and dispersion) from the current input signal being input to the DFE 124. The replica delay cell 140 preferably is identical to the delay cells that are used in the FIR filters 127 and 128, and preferably is made on the same die and by the same process that is used to make the delay cells of the FIR filters 127 and 128. Preferably, the replica delay cell 140 is located on the die very near to the delay cells of the FIR filters 127 and 128. This ensures that the replica delay cell 140 will have a delay time period that is equal to the delay time periods of the delay cells of the FIR filters 127 and 128, as will be described below in detail with reference to FIGS. 5 and 6.

The manner in which the FFE/DFE equalizer 100 operates will now be described. An input signal to be filtered by the FFE/DFE equalizer 100 is received at the input of linear buffer 122, which provides a signal with a pre-selected amplitude at the input of the FFE 123. The buffer 122 could be replaced with an automatic gain control amplifier (not shown) to provide additional dynamic range while maintaining linearity of the signal at the input of the FFE 123. The signal output from the buffer 122 is then input to the unclocked FIR 127 of the FFE 123. The unclocked FIR filter 127 performs finite impulse response filtering of the signal and produces a first filtered output signal, which is provided to the adder 131. The adder 131 adds the first filtered output signal to a second filtered output signal produced by the unclocked FIR filter 128 of the DFE 124 to remove sources of channel degradation, such as ISI and dispersion, for example. The sum of these signals is input to the slicer 129 of the DFE 124, which performs quantization in a known manner to produce a quantized sample value. The quantized signal is input to the unclocked FIR filter 128 of the DFE 124, which performs finite impulse response filtering to produce the aforementioned second filtered output signal.

The quantized signal produced by the slicer 129 is provided to the CDR 125, which performs clock and data recovery in a known manner. The CDR 125 outputs the final filtered signal, which corresponds to the recovered data signal. The recovered clock signal, CLK, is simultaneously provided to the replica delay cell 140 and to the phase detector 150. As indicated above, the replica delay cell 140 provides the same amount of delay as that provided by each of the delay cells of the FIR filters 127 and 128. The amount of delay that the delay cells provide preferably is 1UI. For example, assuming that the input data signal received at the input of buffer 122 has a bit rate of 10 gigabits per second (10 Gb/s), then the bit period is equal to 100 picoseconds. Therefore, in this example, each delay cell, including the replica delay cell 140, should provide a delay time period of 100 picoseconds. The clock period of CLK is also equal to 1UI, which is 100 picoseconds in this example.

The delayed clock signal output from the replica delay cell 140 is input to the phase detector 150. The phase detector 150 measures the phase difference between the delayed clock signal and CLK and outputs a phase difference value, Phase_Diff, to the delay control circuit 160. Based on the Phase_Diff value, the delay control circuit 160 increases or decreases the Delay_Tune value and outputs the adjusted Delay_Tune value to the replica delay element 140. The adjusted Delay_Tune value causes the Phase_Diff value to be adjusted to a value that is closer to zero or to some other minimum threshold (TH) value. The process of measuring the Phase_Diff value and of adjusting the Delay_Tune value is iterated until the delay control circuit 160 has tuned the replica delay cell 140 such that the Phase_Diff value is equal to zero or is less than or equal to some other minimum TH value.

After a determination has been made that the Phase_Diff value is equal to zero or is less than or equal to some other TH value, the delay control circuit 160 provides this Delay_Tune value to the delay cells of the FIR filters 127 and/or 128. The FIR filters 127 and/or 128 then cause the delay time periods provided by each of their respective delay cells to be tuned in accordance with the Delay_Tune value such that they provide the same time delay period as that provided by the replica delay cell 140.

Preferably, the process described above with reference to blocks 140, 150 and 160 of the delay control component 130 is performed as part of a calibration algorithm. One of the advantages of using unclocked circuits in the FFE/DFE equalizer 100 is that unclocked circuits can be powered off when they are not in use. In contrast, clocked circuits generally need to be powered on at all times. Consequently, the use of unclocked circuits in the FEE/DFE equalizer 100 reduces power consumption without sacrificing accuracy. For example, after the calibration algorithm has been performed to tune the replica delay cell 140 and the delay cells of the FIR filters 127 and/or 128 to the proper time delay period, the delay control circuit 160 may disable the replica delay cell 140 and the phase detector 150 by deasserting the Enable signal. Deassertion of the Enable signal causes the replica delay cell 140 and the phase detector 150 to be powered down such that no power or very little power is used by these components when the calibration algorithm is not being performed. In addition, often times a clock distribution circuit (not shown), such as an array of buffers, for example, is used with a CDR to distribute the clock recovered by the CDR to the clocked circuits. In the event that such a clock distribution circuit is used in the FFE/DFE equalizer 100, the clock distribution circuit may also be powered down when the calibration algorithm is not being performed in order to conserve power. These features of the invention improve or maximize the power efficiency of the equalizer 100 without sacrificing the accuracy of the equalizer 100.

The calibration algorithm may be performed automatically at startup when the FFE/DFE equalizer 100 is powered on. Once the calibration algorithm has been performed, the replica delay cell 140, the phase detector 150 and any clock distribution circuits (not shown) may be powered down. An alternative to powering these circuits up at startup and powering them down after the calibration algorithm has been performed is to automatically turn these circuits on periodically and operate them at a low duty cycle so that only negligible power, if any, is dissipated by these circuits when the calibration algorithm is not being performed. The latter approach may improve the accuracy of the FFE/DFE equalizer 100 at very little or no extra costs in terms of power consumption and without any significant increase in circuit complexity. Drifts in the delay time periods of the delay cells caused by temperature and supply voltage variations tend to occur very slowly over time. By periodically turning these circuits on and operating them at a low duty cycle, drifts in the delay time periods of the delay cells caused by temperature and supply voltage variations are calibrated out, thereby improving the accuracy of the equalizer 100 without appreciably increasing power consumption. An alternative to performing the calibration algorithm automatically either at startup or on a periodic basis is to monitor temperature and supply voltage and to only turn on the circuits 140, 150 and 160 to perform the calibration algorithm if a predetermined amount of drift is detected.

It should be noted that the calibration algorithm may be performed while actual data is being processed by the equalizer 100. However, if the calibration algorithm is performed while actual data is being processed, any adjustments that are made by the delay control circuit 160 to the Delay_Tune value should be made very gradually. Sudden adjustments in the Delay_Tune value will typically result in sudden adjustments in the delay time periods of the FIR delay cells, which may induce sudden phase shifts in the input to the CDR 125. In turn, sudden phase shifts in the input to the CDR 125 may cause bit errors. Therefore, adjustment to the Delay_Tune value should be made gradually to ensure that sudden phase shifts in the input of the CDR 125 are avoided.

Figure 5:
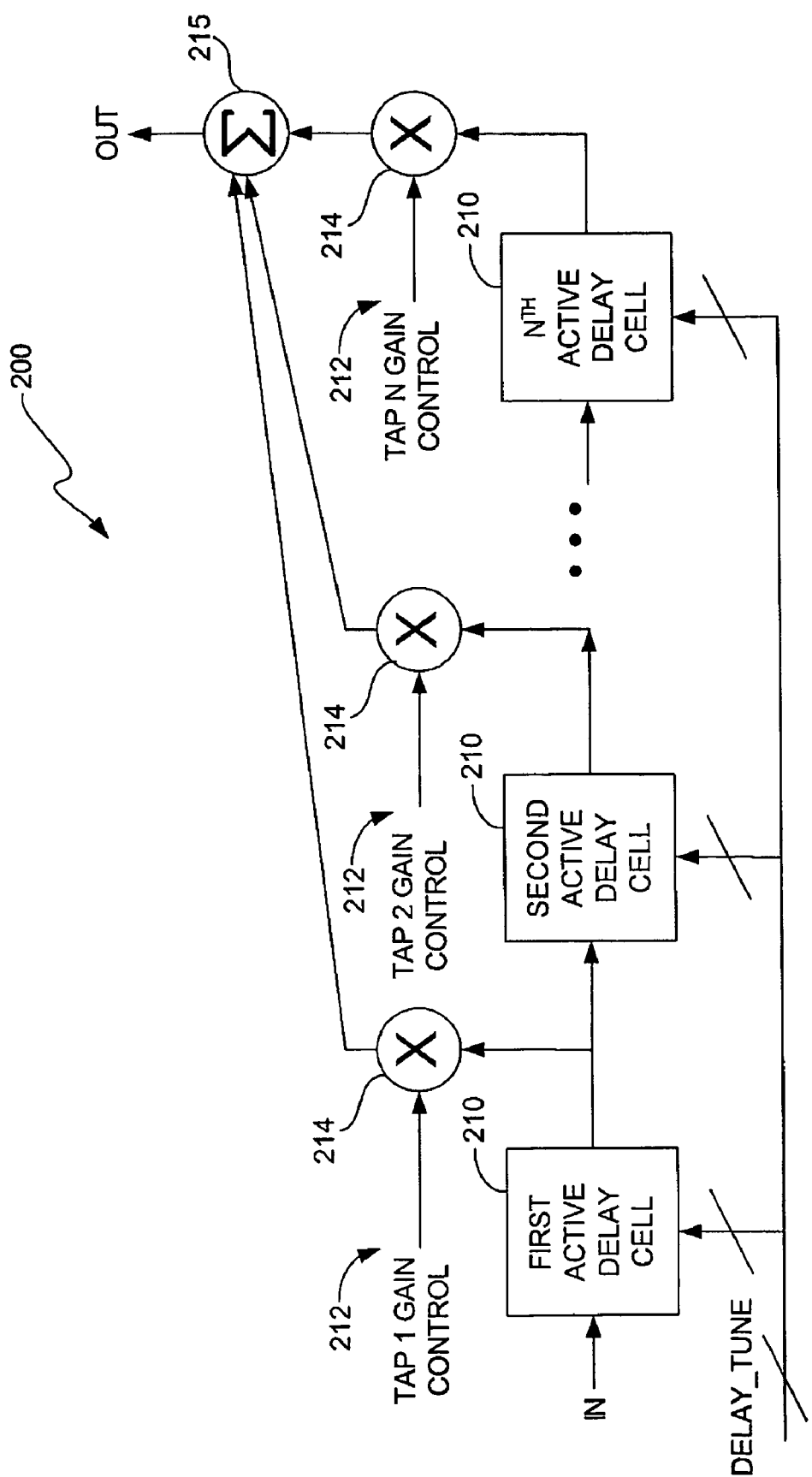
FIG. 5 illustrates a block diagram of an unclocked FIR filter of the invention in accordance with an embodiment, which may be used as the FIR filters of the FFE/DFE equalizer shown in FIG. 4.

FIG. 5 illustrates a block diagram of the unclocked FIR filter 200 of the invention in accordance with an embodiment. The FIR filter 200 uses tunable delay cells 210 having tunable time delay periods that may be fine-tuned to achieve selected time delay periods. The unclocked FIR filter 200 shown in FIG. 5 may be used as the FIR filter 127 and/or as the FIR filter 128 shown in FIG. 4. As indicated above, if an FFE incorporates an unclocked FIR filter of the type described above with reference to FIG. 1, undesirable delay time period drifts that occur in the delay cells generally have minimal impact on the performance of the FFE, provided the drifts are not too large (e.g., not greater than about 20 to 25%). However, if a DFE incorporates an unclocked FIR filter of the type described above with reference to FIG. 1, undesirable delay time period drifts that occur in the delay cells can have a significant detrimental effect on the performance of a DFE. Therefore, preferably at least the FIR filter 128 of the DFE 124 shown in FIG. 4 has the configuration of the FIR filter 200 shown in FIG. 5. The FIR filter 127 of the FFE 123 shown in FIG. 4 may also use the configuration of the FIR filter 200 shown in FIG. 5, or it may use the configuration of the FIR filter 2 shown in FIG. 1. If it is anticipated that drifts in the delay time periods of the delay cells of the FIR 127 may be greater than about 20 to 25%, then preferably the FIR filter 127 will also use the configuration of the FIR filter 200 shown in FIG. 5. The dashed arrow in FIG. 4 leading to the FIR filter 127 is intended to indicate that the corresponding connection is not needed in cases where the FIR filter 127 does not have the configuration of the FIR filter 200 shown in FIG. 5, but instead has the configuration of the FIR filter 2 shown in FIG. 1.

Figure 1:
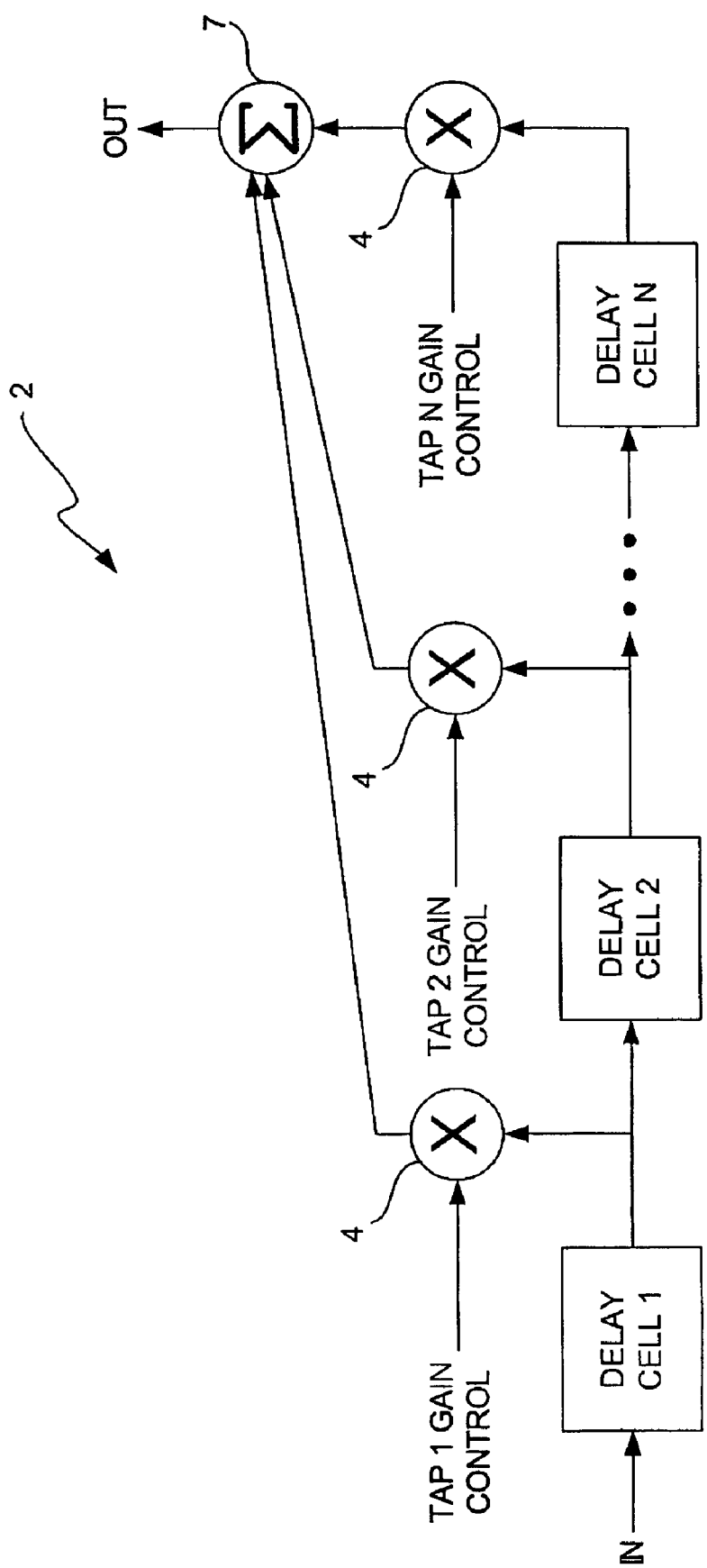
FIG. 1 illustrates a block diagram of a typical known unclocked FIR filter.
Figure 2:
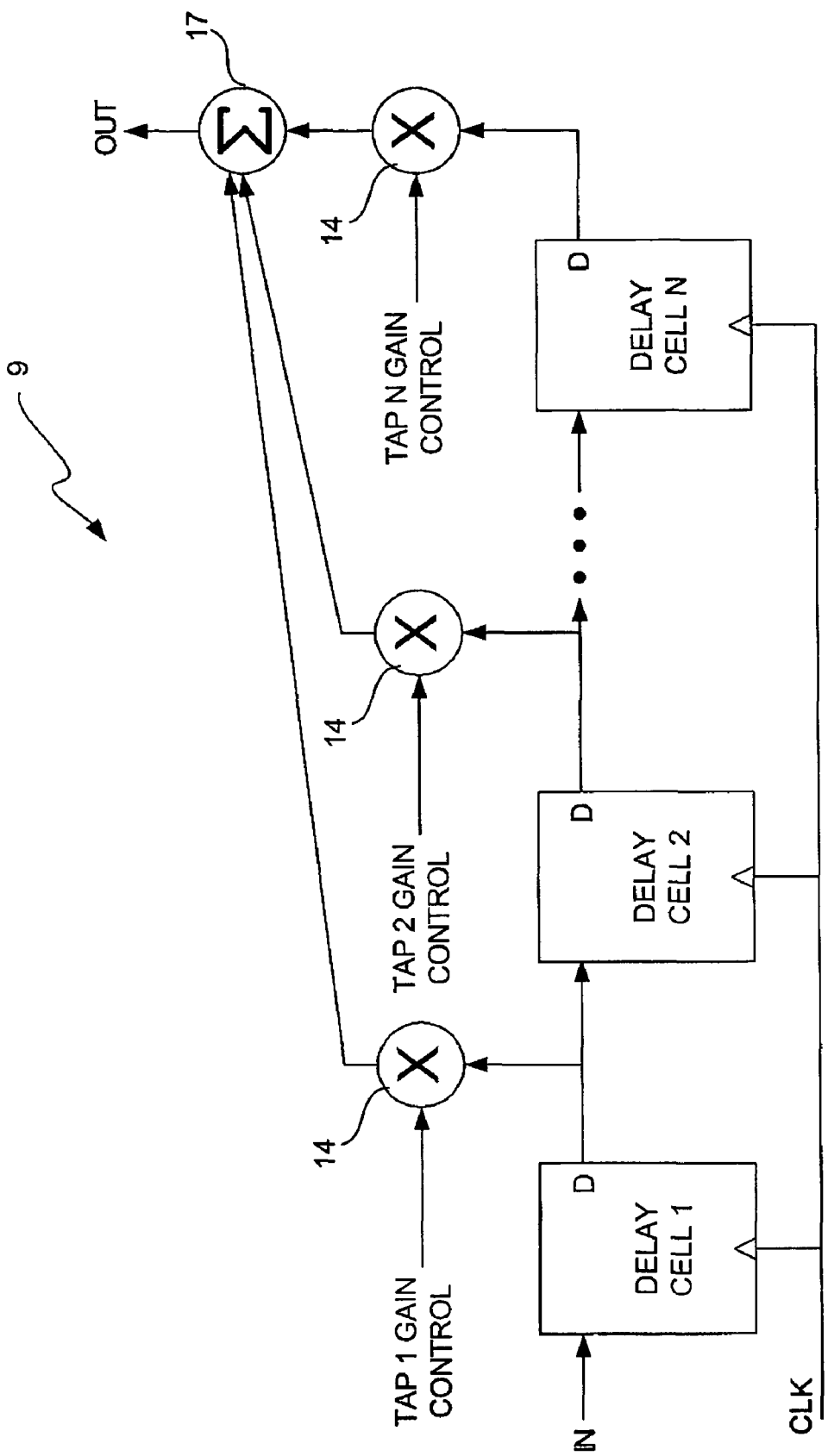
FIG. 2 illustrates a block diagram of a typical known clocked FIR filter.
Figure 3:
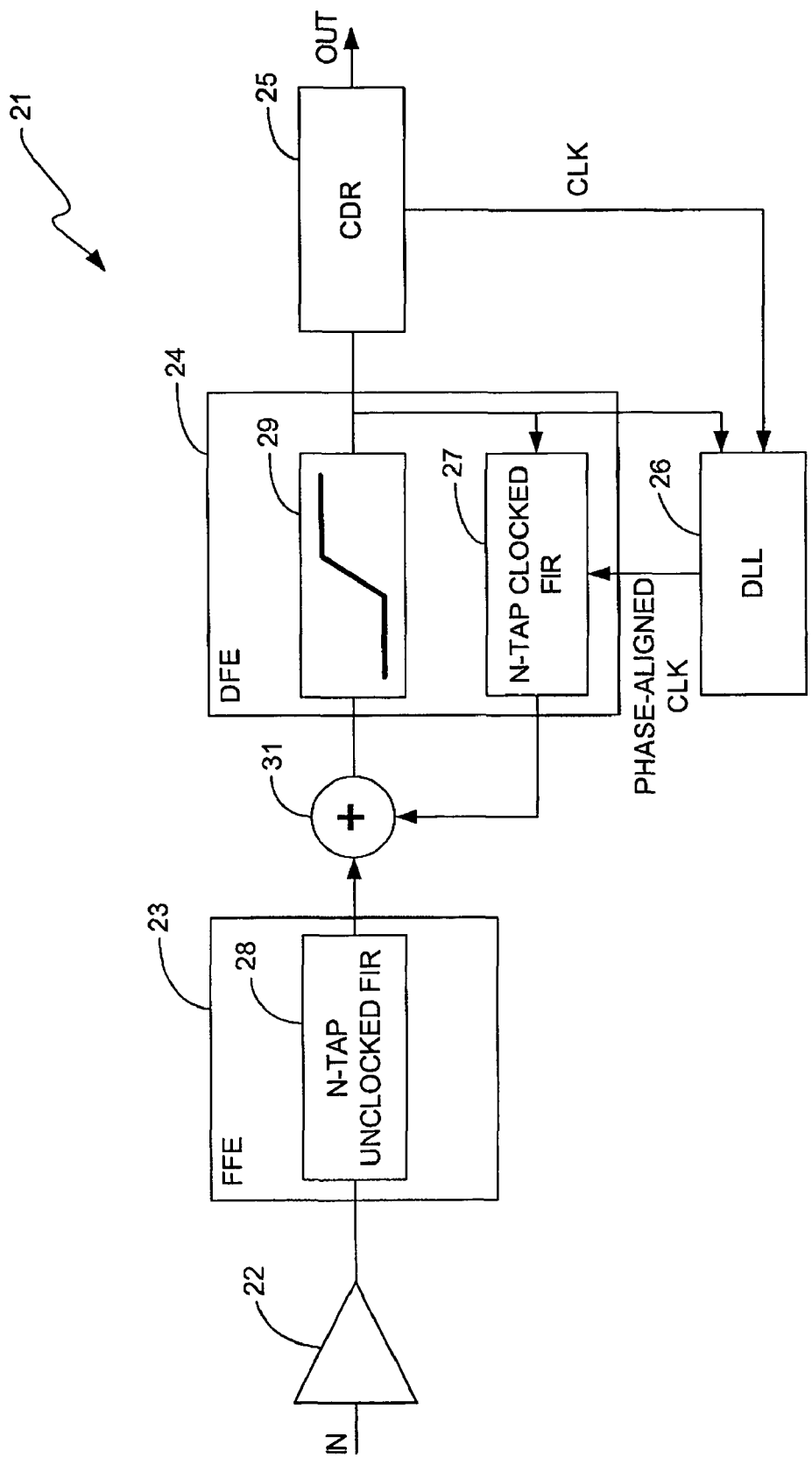
FIG. 3 illustrates a block diagram of a typical known FFE/DFE equalizer.

The FIR filter 200 has N tunable delay cells 210, N taps 212, N multipliers 214, and a summer 215, where N is a positive integer that is equal to or greater than 1. The delay cells 210 of the FIR filter 200 adjust their respective time delay periods based on the Delay_Tune value output from the delay control circuit 160 shown in FIG. 4. The FIR filter 200 preferably is identical to the FIR filter 2 shown in FIG. 1 except that the delay cells of the FIR filter 2 shown in FIG. 1 are non-tunable delay cells having non-tunable time delay periods, whereas the delay cells 210 of the FIR filter 200 shown in FIG. 5 are tunable delay cells having time delay periods that are adjustable, or fine-tunable.

The tunable delay cells 210 may be passive or active devices. For example, passive delay cells do not include transistors, but rather, include passive elements such as capacitors and inductors that make up LC circuits that receive a signal at the inputs of the LC circuits and provide a delayed replica of the input signal at the outputs of the LC circuits. The time delay periods depend on the values of the capacitors (C) and inductors (L) of the LC circuits. The manner in which LC circuits can be made tunable such that their delay time periods are adjusted based on a tuning signal received thereby is well known. Active delay cells include transistors and may include other elements, such as passive elements. The manner in which active delay cells can be configured to adjust their delay time periods based on the value of a tuning signal is also well known. Therefore, a discussion of the makeup and operation of passive and active delay cells is not provided herein in the interest of brevity. The invention is not limited with respect to whether active or passive tunable delay cells are used for this purpose, or with respect to the elements or configuration of the tunable delay cells.

The FIR filter 200 operates as follows. Each respective delay cell 210 receives a respective incoming signal and delays the received signal for a predetermined time delay period. The signal received by the first delay cell 210 is the original input signal to the FIR filter 200. The signal received by the second delay cell 210 is the delayed version of the input signal output from the first delay cell 210. The signal that is received by the $N^{th}$ delay cell 210 is the delayed signal output from the $N^{th}$-1 delay cell (not shown). Assuming that each delay cell 210 delays the signal received thereby by 1t, where t is the time delay period, then the delay versions of the input signal that are output from the $1^{st}$ through $N^{th}$ delay cells 210 are output at times 1t through Nt, respectively. The delay time periods of the delay cells 210 are identical, or at least substantially identical. Consequently, the delay cells 210 receive their respective input signals at their respective inputs at the same instant in time and output the respective delayed versions of the input signal at the same instant in time. The respective multipliers 214 multiply the respective delayed versions of the input signal output from the respective delay cells 210 by their respective tap gain control values entered at the respective tap inputs 212 of the FIR filter 200. The resulting respective signals are then summed by the summer 215 to produce the final filtered output signal of the FIR filter 200.

All of the delay cells 210 receive the same Delay_Tune value output from the delay control circuit 160 shown in FIG. 4 and tune their delay time periods based on the received Delay_Tune value. The Delay_Tune value is typically a multi-bit value. As indicated above, the delay cells 210 are identical to each other and are identical to the replica tunable delay cell 140 (FIG. 4). The replica delay cell 140 (FIG. 4) and the delay cells 210 preferably are made on the same die during the same IC manufacturing process using the same IC process technology, and preferably are co-located (i.e., located in the same die area). Consequently, it can be safely assumed that if the delay time period of the replica delay cell 140 (FIG. 4) has drifted, the time periods of the delay cells 210 have also drifted by an equal amount. Therefore, any adjustment that is made to the delay time period of the replica delay cell 140 (FIG. 4) will also be made to the delay cells 210 of the FIR filter 200. As indicated above, the delay control circuit 160 (FIG. 4) calculates the Delay_Tune value and adjusts this value as necessary until the delay time period exhibited by the replica delay cell 140 (FIG. 4) results in the Phase_Diff value output by the phase detector 150 (FIG. 4) being equal to zero or being equal to or greater than some minimum TH value. This final Delay_Tune value is then sent to each of the tunable delay cells 210 shown in FIG. 5 to cause the tunable delay cells 210 to adjust their respective time delay periods to be equal to the time delay period of the replica delay cell 140 (FIG. 4). Adjusting the time delay periods of the delay cells 210 in this manner ensures that the time delay periods exhibited by the delay cells 140 and 210 are identical, or at least substantially identical, and that the delay time periods are equal to the period of the recovered clock, CLK (FIG. 4).

The range of the Delay_Tune value should be set just wide enough to allow the target time delay periods to be achieved by the delay cells 210 at all corners. Additionally, care should be taken to ensure that there is no time delay or only a negligible time delay (e.g., due to layout parasitic capacitance) between the instant in time that the rising edge of CLK arrives at the input of the phase detector 150 (FIG. 4) and the instant in time that the same rising edge of CLK arrives at the input of the replica delay cell 140 (FIG. 4). Similarly, care should also be taken to ensure that there is also no delay or only negligible delay between the instant in time that the replica delay cell 140 (FIG. 4) outputs its delayed version of CLK and the instant in time that the actual CLK (i.e., the non-delayed CLK) is input to the phase detector 150 (FIG. 4). Any delay incurred in these nodes may reduce the accuracy of the phase difference measurement taken by the phase detector 150 (FIG. 4), and hence may reduce the accuracy of the Delay_Tune value output from the delay control circuit 160 (FIG. 4).

The time delay period exhibited by each of the delay cells 210 and 140 will typically be 1UI, but may be less than 1UI (e.g., 0.5UI). If both the FIR filter 127 and the FIR filter 128 shown in FIG. 4 have the configurations of the FIR filter 200 shown in FIG. 5, then the delay cells of the FIR filters 127 and 128 should all be configured to have the same time delay periods. It is possible for the delay cells of the FIR filter 127 to have time delay periods that are less than 1UI (i.e., fractional delay periods) while the delay cells of the FIR filter 128 have time delay periods that are equal to 1UI. In such cases, however, each 1 UI delay cell of the FIR filter 128 should be implemented as multiple fractional UI delay cells. For example, if the fractional delay period of each delay cell of the FFE 123 is 0.5UI, then each delay cell of the DFE 124 could be implemented by cascading two 0.5UI delay cells. In this case, the time delay periods of all of the delay cells of both the FFE 123 and the DFE 124 can be set using one common Delay_Tune signal generated by the delay control circuit 160 in the manner described above with reference to FIG. 4.

Figure 6:
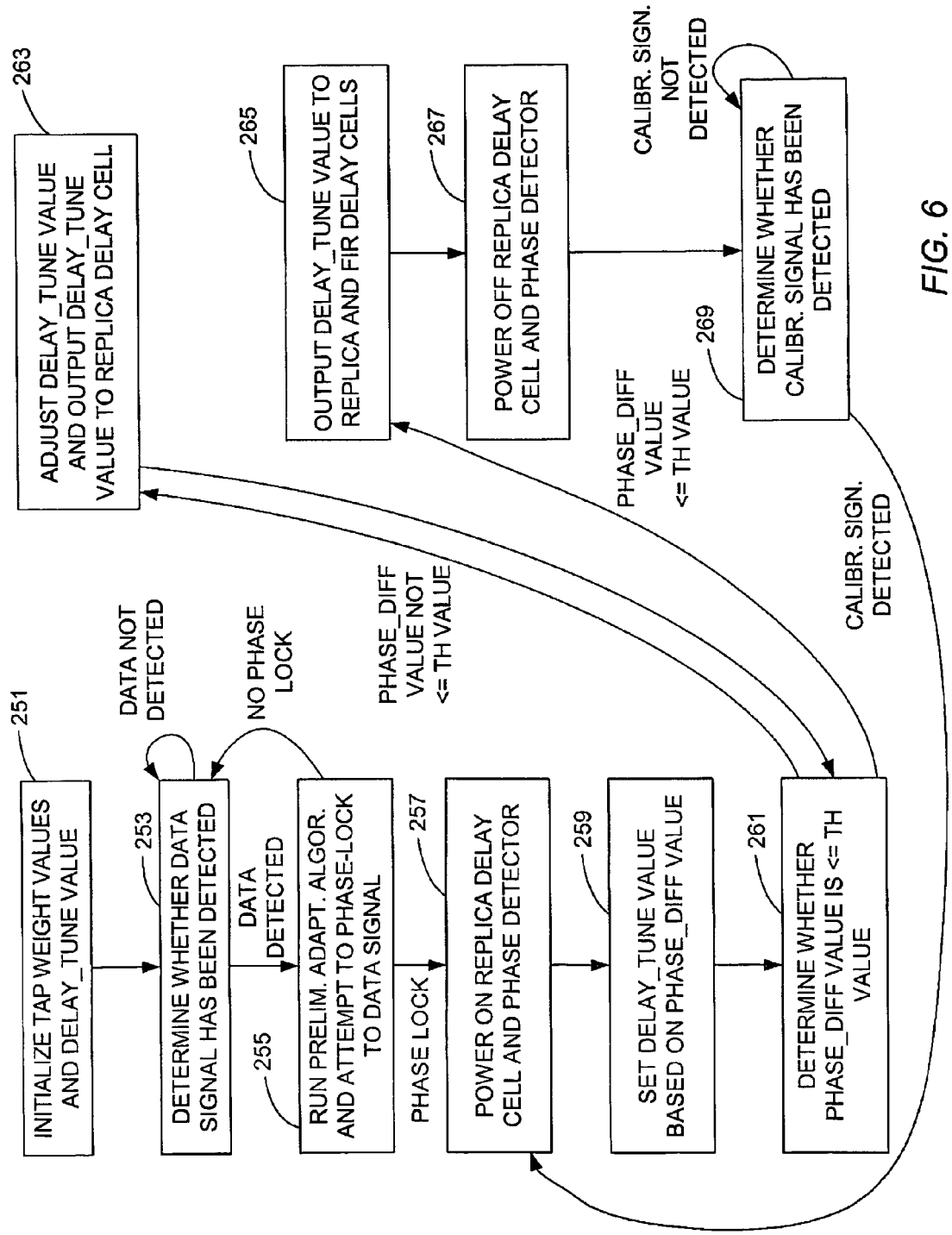
FIG. 6 illustrates a state diagram that represents the algorithm performed by the FFE/DFE equalizer shown in FIG. 4 in accordance with an embodiment.

FIG. 6 illustrates a state diagram that represents the calibration algorithm performed by the FFE/DFE equalizer 100 (FIG. 4) in accordance with an embodiment. The FFE/DFE algorithm will now be described with reference to FIGS. 4-6. At the start of the FFE/DFE algorithm, the tap weight values input to the taps 212 (FIG. 5) and the Delay_Tune value (FIG. 4) input to the delay cells 210 (FIG. 5) are initialized to default values, as indicated by block 251. The task of initializing these values may be performed by control logic (not shown) within the FFE/DFE equalizer 100 (FIG. 4) or by control logic (not shown) external to the FFE/DFE equalizer 100 (FIG. 4). If the initialization task is performed by control logic within the FFE/DFE equalizer 100 (FIG. 4), the control logic may be implemented within the delay control circuit 160 (FIG. 4), which is typically a state machine.

After the initialization task has been performed, the process exits the state represented by block 251 and enters the state represented by block 253. In the state represented by block 253, a determination is made as to whether the data signal has been detected at the input to the FFE 123 (FIG. 4). The process remains in this state until a determination is made that data has been detected, at which time the process exits the state represented by block 253 and enters the state represented by block 255. In this state, the process runs a preliminary adaptation algorithm on the FFE 123 (FIG. 4) during which the CDR 125 (FIG. 4) attempts to phase-lock to the data signal to extract the clock CLK from the data signal. If the CDR 125 (FIG. 4) is unable to phase-lock to the data signal, the process exits state 255 and re-enters state 253. The process switches between the states represented by blocks 253 and 255 until a determination is made at the state represented by block 255 that the CDR 125 (FIG. 4) has successfully locked to the data signal.

Once the CDR 125 (FIG. 4) has successfully locked to the data signal, the process exits the state represented by block 255 and enters the state represented by block 257. In the state represented by block 257, the delay control circuit 160 (FIG. 4) asserts the Enable signal (FIG. 4) to power on the replica delay cell 140 (FIG. 4) and the phase detector 150 (FIG. 4). The process then exits the state represented by block 257 and enters the state represented by block 259. In this state, the delay control circuit 160 sets the Delay_Tune value based on an evaluation of the Phase_Diff value output from the phase detector 150 (FIG. 4). The process then exits the state represented by block 259 and enters the state represented by block 261. In the state represented by block 261, the delay control circuit 160 determines whether the Phase_Diff value is equal to zero or is less than or equal to some other minimum TH value. If the delay control circuit 160 (FIG. 4) determines that the Phase_Diff value is not equal to zero or is not less than or equal to the minimum TH value, then the process exits the state represented by block 261 and enters the state represented by block 263. In the state represented by block 263, the delay control circuit 160 adjusts the Delay_Tune value and outputs the adjusted Delay_Tune value to the replica delay cell 140 (FIG. 4). The process then returns to the state represented by block 261.

If in the state represented by block 261 the delay control circuit 160 (FIG. 4) determines that the Phase_Diff value is equal to zero or is less than or equal to some other minimum TH value, then the process exits the state represented by block 261 and enters the state represented by block 265. In the state represented by block 265, the delay control circuit 160 (FIG. 4) outputs the Delay_Tune value to the replica delay cell 140 (FIG. 4) and to the FIR delay cells 210 (FIG. 5), which adjusts their delay time periods in accordance with the Delay_Tune value. This Delay_Tune value remains set at this value until the algorithm is invoked at some later time (e.g., upon startup of the FFE/DFE equalizer 100). The process then exits the state represented by block 265 and enters the state represented by block 267. In the state represented by block 267, the delay control circuit 160 (FIG. 4) deasserts the Enable signal to cause the replica delay cell 140 and the phase detector 150 (FIG. 4) to be powered down. The process then exits the state represented by block 267 and enters the state represented by block 269. In the state represented by block 269, the process waits to receive a calibration signal instructing the delay control circuit 160 (FIG. 4) to re-perform the calibration algorithm. As long as the calibration signal is not detected, the process remains in the state represented by block 269. If the process detects the calibration signal, then the process exits the state represented by block 269 and re-enters the state represented by block 257. If the process re-enters the state represented by block 257, the Enable signal (FIG. 4) is reasserted to cause the replica delay cell 140 (FIG. 4) and the phase detector 150 (FIG. 4) to be powered on. The calibration algorithm is then re-performed in the manner described above with reference to blocks 259-269.

The FFE/DFE equalizer 100 described above with reference to FIGS. 4-6 may be used for any purpose and in any environment in which equalizers are deemed useful. For example, the equalizer 100 may be used in an optical receiver to equalize a data signal received by the receiver over an optical fiber link. In this case, the received optical signal is converted by an optical-to-electrical converter (e.g., a photodiode) into an electrical data signal. Subsequently, and typically after some other conditioning of the electrical data signal has been performed (e.g., amplification), the electrical data signal would be processed by the equalizer 100 to equalize the electrical data signal prior to or during the data recovery process.

As another example, the equalizer 100 may be used in an optical transmitter to equalize an electrical data signal prior to the electrical data signal being used to modulate a laser of the transmitter. In this case, the equalizer 100 is used to shape, pre-equalize or pre-distort the electrical data signal to produce a shaped, pre-equalized or pre-distorted data signal, which would subsequently be used to modulate the laser. The term "equalized", as that term is used herein, is intended to include, but not to be limited to, the condition of a signal that has been passed through the equalizer 100 when it is implemented in a receiver as well as the condition of a signal that has been passed through the equalizer 100 when it is implemented in a transmitter. Similarly, the term "equalization", as that term is used herein, is intended to include, but not to be limited to, the process performed by the equalizer 100 when it is implemented in a receiver to perform equalization as well as the process performed by the equalizer 100 when it is implemented in a transmitter to perform pre-equalization, pre-distortion or shaping.

As yet another example, one or more instances of the equalizer 100 may be used in an optical transceiver. In this case, the equalizer 100 would be used to perform equalization on the receive side of the transceiver and to perform pre-equalization (i.e., shaping or pre-distortion) on the transmit side of the transceiver. In addition, the equalizer 100 may be used in electrical transmitters, receivers and transceivers that transmit and receive electrical data signals rather than optical data signals. Also, the equalizer 100 may be used to perform equalization and/or pre-equalization on signals other than data signals. The invention is not limited with respect to the purpose for which the equalizer 100 is used or with respect to the environment in which the equalizer 100 is used.

Also, the invention is not limited to the configuration of the equalizer 100 shown in FIG. 4. For example, the FFE 123 could be eliminated from the equalizer 100, in which case the equalizer 100 would function as a DFE equalizer. Similarly, the DFE 124 could be eliminated from the equalizer 100, in which case the equalizer 100 would function as an FFE equalizer. Also, although the CDR 125 is shown as being a component of the equalizer 100, the CDR 125 could be external to the equalizer 100 and simply provide CLK to the equalizer 100. Persons of ordinary skill in the art will understand, in view of the description provided herein, the manner in which these and other modifications can be made to the configuration of the equalizer 100 shown in FIG. 4.

It should be noted that the invention has been described with respect to illustrative embodiments for the purpose of describing the principles and concepts of the invention. The invention is not limited to these embodiments. For example, while the invention has been described with reference to particular calibration and FFE/DFE algorithms, the invention is not limited to these particular algorithms. As will be understood by those of ordinary skill in the art in view of the description being provided herein, many modifications may be made to these algorithms while still achieving the goals of the invention. For example, the state diagram represented by FIG. 6 could be modified so that instead of the process waiting in the state represented by block 269 for a calibration signal to be detected, the process sets a timer after exiting the state represented by block 267. In this case, when the timer expires, the process would re-enter the state represented by block 257. Also, if conserving power is not a priority, the replica delay cell 140 (FIG. 4) and the phase detector 150 (FIG. 4) could remain powered on at all times, in which case the states represented by blocks 257, 267 and 269 could be eliminated. As will be understood by persons of ordinary skill in the art, these and other modifications may be made to the embodiments described herein, and all such modifications are within the scope of the invention.

What is claimed is:

1. An equalizer for performing equalization on an input electrical signal to produce an equalized output electrical signal, the equalizer comprising:

at least a first finite impulse response (FIR) filter comprising N tunable delay cells cascaded between an input of the first FIR filter and an output of the first FIR filter, the first FIR filter processing a first input signal received at the input of the first FIR filter to produce a first output signal at the output of the first FIR filter, each tunable delay cell providing a respective time delay period during which a respective input signal to the respective delay cell is delayed before being output from the respective delay cell, and wherein the time delay periods provided by the respective tunable delay cells of the FIR filter are tunable to allow the respective time delay periods to be adjusted; and a delay control component configured to perform a calibration algorithm, the delay control component comprising at least one replica tunable delay cell that provides a time delay period that is tunable to allow the tunable time delay period of the replica delay cell to be varied by a selected amount, and wherein the replica delay cell receives an input clock signal, CLK, at an input to the replica delay cell and delays CLK by the tunable time delay period provided by the replica delay cell before outputting a delayed CLK at an output of the replica delay cell, the delay control component including circuitry that measures a phase difference value, Phase_Diff, between the input CLK and the delayed CLK, the calibration algorithm determining an amount by which the respective tunable time delay periods of the N tunable delay cells of the first FIR filter are to be adjusted based on the Phase_Diff value and adjusting the respective tunable time delay periods by the determined amount such that the respective tunable delay cells provide the adjusted respective time delay periods.

2. The equalizer of claim 1, wherein said circuitry of the delay control component comprises:

phase measurement circuitry that measures the phase difference between the input CLK and the delayed CLK to obtain the Phase_Diff value; and a delay control circuit that receives the Phase_Diff value measured by the phase measurement circuitry and determines the amount by which the respective tunable time delay periods of the tunable delay cells are to be adjusted based on the Phase_Diff value received by the delay control circuit, and wherein the delay control circuit sends a Delay_Tune signal to the tunable delay cells to cause the respective tunable time delay periods to be adjusted by the determined amount.

3. An equalizer for performing equalization on an input electrical signal to produce an equalized output electrical signal, the equalizer comprising:

a feed-forward equalizer (FFE) configured to receive an FFE input signal and to process the FFE input signal to produce an FFE output signal, the FFE including a first finite impulse response (FIR) filter having a plurality of delay cells cascaded between the input of the first FIR filter and the output of the first FIR filter, each delay cell providing a respective time delay period during which a respective input signal to the respective delay cell is delayed before being output from the respective delay cell, the first FIR producing a first filtered signal at the output of the first FIR filter;

a decision feedback equalizer (DFE) configured to receive a DFE input signal at an input of the DFE and to process the DFE input signal to produce a DFE output signal at an output of the DFE, the DFE including a second FIR filter and a slicer, the second FIR filter of the DFE having a plurality of delay cells cascaded between the input and the output of the second FIR filter, the second FIR producing a second filtered signal at the output of the second FIR filter, the slicer having an input that is coupled to the input of the DFE and an output that is coupled to the input of the second FIR filter, wherein the slicer quantizes the DFE input signal to produce the DFE output signal;

a combiner configured to receive the FFE output signal and the second filtered signal and to combine the FFE output signal and the second filtered signal to produce the DFE input signal; and a delay control component configured to perform a calibration algorithm, wherein the delay cells of one or both of the first and second FIR filters are tunable delay cells, each respective tunable delay cell providing a respective time delay period that is tunable to allow the respective tunable time delay period to be adjusted, the delay control component comprising at least one replica tunable delay cell that provides a time delay period that is tunable to allow the tunable time delay period of the replica delay cell to be varied by a selected amount, and wherein the replica delay cell receives an input clock signal, CLK, at an input to the replica delay cell and delays CLK by the tunable time delay period of the replica delay cell before outputting a delayed CLK at an output of the replica delay cell, the delay control component including circuitry that measures a phase difference value, Phase_Diff, between the input CLK and the delayed CLK, and wherein the calibration algorithm determines an amount by which the respective tunable time delay periods of the tunable delay cells are to be adjusted based on the Phase_Diff value and adjusts the respective tunable time delay periods of the tunable delay cells of one or both of the first and second FIR filters by the selected amount such that the respective tunable delay cells provide the adjusted respective time delay periods.

4. The equalizer of claim 3, wherein said circuitry of the delay control component comprises:

a phase detector that receives CLK at a first input of the phase detector and that receives the delayed CLK output from the replica delay cell at a second input of the phase detector, wherein CLK is received at the first input of the phase detector at substantially a same instant in time that CLK is received at the input of the replica delay cell, the phase detector measuring the Phase_Diff value; and a delay control circuit that receives the Phase_Diff value measured by the phase detector and determines the amount by which the respective tunable time delay periods of the tunable delay cells are to be adjusted based on the Phase_Diff value received by the delay control circuit, and wherein the delay control circuit sends a Delay_Tune signal to the tunable delay cells to cause the respective tunable time delay periods of the tunable delay cells to be adjusted by the determined amount.

5. The equalizer of claim 4, wherein the replica tunable delay cell is at least substantially identical to each of the tunable FIR delay cells, and wherein the replica tunable delay cell and the tunable FIR delay cells are contained in a same integrated circuit (IC) die and are manufactured during a same IC manufacturing process using a same IC manufacturing technology.

6. The equalizer of claim 5, wherein the delay cells of the first FIR filter are non-tunable delay cells having respective non-adjustable delay time periods, and wherein the delay cells of the second FIR are the tunable delay cells having respective tunable time delay periods that are adjustable.

7. The equalizer of claim 5, wherein the delay cells of the first and second FIR filters are the tunable delay cells having respective tunable delay time periods that are adjustable.

8. The equalizer of claim 5, wherein the tunable delay cells are passive delay cells.

9. The equalizer of claim 5, wherein the tunable delay cells are active delay cells.

10. An equalizer for performing equalization on an input electrical signal to produce an equalized output electrical signal, the equalizer comprising:
a feed-forward equalizer (FFE) configured to receive an FFE input signal and to process the FFE input signal to produce an FFE output signal, the FFE having an input, an output and a first finite impulse response (FIR) filter, the first FIR filter having an input that is coupled to the input of the FFE and having an output that is coupled to the output of the FFE, the first FIR filter having a plurality of delay cells cascaded between the input of the first FIR filter and the output of the first FIR filter, each delay cell providing a respective time delay period during which a respective input signal to the respective delay cell is delayed before being output from the respective delay cell, the first FIR producing a first filtered signal at the output of the first FIR filter;
a decision feedback equalizer (DFE) configured to receive a DFE input signal and to process the DFE input signal to produce a DFE output signal, the DFE having an input, an output, a second FIR filter, and a slicer, the second FIR filter having an input that is coupled to an output of the DFE, the second FIR filter having N tunable delay cells cascaded between the input and the output of the second FIR filter, where N is a positive integer that is equal to or greater than one, each tunable delay cell of the second FIR filter providing a respective time delay period during which a respective input signal to the respective tunable delay cell of the second FIR filter is delayed before being output from the respective delay cell of the second FIR filter, and wherein the time delay periods provided by the respective tunable delay cells of the second FIR filter are tunable to allow the respective tunable time delay periods to be adjusted by a selected amount, the slicer having an output that is coupled to the input of the second FIR filter, wherein the slicer quantizes the DFE input signal to produce the DFE output signal, the second FIR producing a second filtered signal at the output of the second FIR filter;
a combiner configured to receive the FFE output signal and the second filtered signal and to combine the FFE output signal and the second filtered signal to produce the DFE input signal; and
a delay control component configured to perform a calibration algorithm, the delay control component comprising at least one replica tunable delay cell that provides a time delay period that is tunable to allow the tunable time delay period of the replica delay cell to be varied by a selected amount, and wherein the replica delay cell receives an input clock signal, CLK, at an input to the replica delay cell and delays CLK by the tunable time delay period of the replica delay cell before outputting a delayed CLK at an output of the replica delay cell, the delay control component including circuitry that measures a phase difference value, Phase_Diff, between the input CLK and the delayed CLK, the calibration algorithm determining an amount by which the respective tunable time delay periods of the tunable delay cells of the second FIR filter are to be adjusted based on the Phase_Diff value and adjusting the respective tunable time delay periods of the tunable delay cells of the second FIR filter by the selected amount such that the respective tunable delay cells of the second FIR filter provide the adjusted respective time delay periods.

11. The equalizer of claim 10, wherein said circuitry of the delay control component comprises:
a phase detector that receives CLK at a first input of the phase detector and that receives the delayed CLK output from the replica delay cell at a second input of the phase detector, wherein CLK is received at the first input of the phase detector at substantially a same instant in time that CLK is received at the input of the replica delay cell, the phase detector measuring the Phase_Diff value between a phase of CLK received at the first input of the phase detector and a phase of the delayed CLK received at the second input of the phase detector; and
a delay control circuit that receives the Phase_Diff value measured by the phase detector and determines the selected amount by which the respective tunable time delay periods of the delay cells of the second FIR filter are to be varied based on the Phase_Diff value received by the delay control circuit, and wherein the delay control circuit sends a Delay_Tune signal to the delay cells of the second FIR filter to cause the respective tunable time delay periods to be adjusted by the selected amount.

12. The equalizer of claim 11, wherein the replica tunable delay cell is at least substantially identical to each of the tunable delay cells of the second FIR filter, and wherein the replica delay cell and the delay cells of the second FIR filter are contained in a same integrated circuit (IC) die in close proximity to one another and are manufactured during a same IC manufacturing process using a same IC manufacturing technology.

13. The equalizer of 11, wherein the first FIR filter has N delay cells, and wherein the delay cells of the first FIR filter are tunable delay cells that have tunable time delay periods, the tunable delay cells of the first FIR filter being at least substantially identical to the tunable delay cells of the second FIR filter, and wherein the respective time delay periods provided by the respective tunable delay cells of the first FIR filter are at least substantially equal to the respective time delay periods provided by the respective tunable delay cells of the second FIR filter, and wherein when the delay control component adjusts the respective tunable time delay periods of the delay cells of the second FIR filter by the determined amount, the delay control component simultaneously adjusts the respective tunable time delay periods of the delay cells of the first FIR filter by the determined amount such that all of the delay cells of the first and second FIR filters provide the adjusted respective time delay periods.

14. A method for performing equalization on an input electrical signal in an equalizer to produce an equalized output electrical signal, the method comprising:
providing at least a first finite impulse response (FIR) filter comprising N tunable delay cells cascaded between an input of the first FIR filter and an output of the first FIR filter;
in the first FIR filter, processing a first FIR input signal received at the input of the first FIR filter to produce a first FIR output signal at the output of the first FIR filter, each delay cell providing a respective time delay period during which a respective input signal to the respective delay cell is delayed before being output from the respective delay cell, and wherein the time delay periods provided by the respective delay cells of the first FIR filter are tunable to allow the respective tunable time delay periods to be adjusted;

providing at least one replica tunable delay cell that provides a time delay period that is tunable to allow the tunable time delay period of the replica delay cell to be varied by a selected amount;

inputting a clock signal, CLK, at an input to the replica delay cell, the input CLK being delayed by the replica delay cell by the tunable time delay period of the replica delay cell such that a delayed CLK is output at an output of the replica delay cell;

measuring a phase difference value, Phase_Diff, between the input CLK and the delayed CLK; and in a delay control circuit, performing a calibration algorithm that determines an amount by which the respective tunable time delay periods are to be adjusted based on the Phase_Diff value and that adjusts the respective tunable time delay periods of the respective N tunable delay cells by the determined amount such that the respective N tunable delay cells provide the adjusted respective time delay periods.

15. The method of claim 14, wherein the step of measuring the phase difference value comprises:

in a phase detector, receiving said input CLK at a first input of the phase detector and receiving the delayed CLK output from the replica delay cell at a second input of the phase detector, wherein said input CLK is received at the first input of the phase detector at substantially a same instant in time that said input CLK is received at the input of the replica delay cell; and in the phase detector, measuring the Phase_Diff value.

16. The method of claim 15 comprising performing the calibration algorithm when the equalizer is powered on as part of a start up initialization algorithm.

17. The method of claim 16 further comprising powering off the replica delay cell and the phase detector after the calibration algorithm has been performed.

18. The method of claim 15, wherein the calibration algorithm is performed periodically.

19. The method of claim 18, wherein the replica delay cell and the phase detector are powered off at times when the calibration algorithm is not being performed.

20. The method of claim 15, wherein the calibration algorithm is performed while real data is being processed by the first FIR filter.

21. A method for performing equalization on an input electrical signal in a feed-forward equalizer/decision feedback equalizer (FFE/DFE equalizer) to produce an equalized output electrical signal, the method comprising:

providing a feed-forward equalizer (FFE), the FFE including a first finite impulse response (FIR) filter having a plurality of delay cells cascaded between an input of the first FIR filter and an output of the first FIR filter, each delay cell providing a respective time delay period during which a respective input signal to the respective delay cell is delayed before being output from the respective delay cell;

in the FFE, receiving an FFE input signal and processing the FFE input signal to produce a first FFE output signal;

providing a decision feedback equalizer (DFE), the DFE including a second FIR filter and a slicer, the second FIR filter of the DFE having a plurality of delay cells cascaded between the input and the output of the second FIR filter, the slicer having an output that is coupled to the input of the second FIR filter;

in the DFE, receiving a DFE input signal at an input of the DFE and processing the DFE input signal to produce a DFE output signal, wherein the slicer quantizes the DFE input signal to produce the DFE output signal, in a combiner, receiving and combining the output signals of the FFE and the second FIR filter to produce the DFE input signal;

providing in a delay control component that comprises at least one replica tunable delay cell that provides a time delay period that is tunable to allow the tunable time delay period of the replica delay cell to be varied by a selected amount; inputting a clock signal, CLK, at an input to the replica delay cell, the input CLK being delayed by the replica delay cell by the tunable time delay period of the replica delay cell such that a delayed CLK is output at an output of the replica delay cell;

measuring a phase difference value, Phase_Diff, between the input CLK and the delayed CLK; and performing a calibration algorithm in the delay control component, wherein the delay cells of one or both of the first and second FIR filters are tunable delay cells, each respective tunable delay cell providing a respective time delay period that is tunable to allow the respective tunable time delay period to be adjusted by an amount, and wherein the calibration algorithm determines an amount by which the respective tunable time delay periods are to be adjusted based on the Phase_Diff value and adjusts the respective tunable time delay periods of the tunable delay cells of one or both of the first and second FIR filters by the determined amount such that the respective tunable delay cells provide the adjusted respective time delay periods.

22. The method of claim 21, wherein the replica tunable delay cell is at least substantially identical to each of the tunable FIR delay cells, and wherein the replica tunable delay cell and the tunable FIR delay cells are contained in a same integrated circuit (IC) die and are manufactured during a same IC manufacturing process using a same IC manufacturing technology.

23. The method of claim 21, wherein the delay cells of the first FIR filter are non-tunable delay cells having respective non-adjustable delay time periods, and wherein the delay cells of the second FIR filter are the tunable delay cells having respective tunable time delay periods that are adjustable.

24. The method of claim 21, wherein the delay cells of the first and second FIR filters are the tunable delay cells having respective tunable delay time periods that are adjustable.

25. The method of claim 21 comprising performing calibration algorithm when the equalizer is powered on as part of a start up initialization algorithm.

26. The method of claim 21 further comprising:
powering off the replica delay cell and the phase detector after the calibration algorithm has been performed.

27. The method of claim 21 further comprising:
performing the calibration algorithm periodically.

28. The method of claim 21, wherein the replica delay cell and the phase detector are powered off at times when the calibration algorithm is not being performed.

29. The method of claim 21, wherein the calibration algorithm is performed while real data is being processed by the FFE and the DFE.

* * * * *